US012680505B1

(12) United States Patent
Beeson

(10) Patent No.: US 12,680,505 B1
(45) Date of Patent: Jul. 14, 2026

(54) CARBIDE TORCH IGNITER

(71) Applicant: RTX Corporation, Farmington, CT (US)

(72) Inventor: William Joseph Beeson, San Diego, CA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/290,838

(22) Filed: Aug. 5, 2025

(51) Int. Cl.
  *F02C 7/264* (2006.01)

(52) U.S. Cl.
  CPC .... *F02C 7/264* (2013.01); *F23R 2900/00009* (2013.01)

(58) Field of Classification Search
  CPC .................. F02C 7/264; F23R 2900/00009
  See application file for complete search history.

(56) References Cited

U.S. PATENT DOCUMENTS

| | | | | |
|---|---|---|---|---|
| 1,612,694 | A | * | 12/1926 | Belt ......................... F21L 23/00 |
| | | | | 48/4 |
| 3,954,389 | A | * | 5/1976 | Szetela .................. F23M 5/085 |
| | | | | 60/753 |
| 4,630,553 | A | | 12/1986 | Goetzman |
| 4,860,533 | A | * | 8/1989 | Joshi ......................... F02C 7/264 |
| | | | | 60/776 |
| 5,636,511 | A | * | 6/1997 | Pfefferle ................. F23C 13/00 |
| | | | | 60/39.822 |
| 11,549,441 | B1 | * | 1/2023 | Ryon ......................... F23Q 7/26 |
| 11,674,445 | B2 | * | 6/2023 | Ryon ...................... F01D 25/12 |
| | | | | 60/39.821 |
| 11,674,446 | B2 | * | 6/2023 | Ryon ...................... F23R 3/283 |
| | | | | 60/39.821 |
| 11,773,784 | B2 | * | 10/2023 | Ryon ...................... F23R 3/286 |
| | | | | 60/776 |
| 2021/0215100 | A1 | * | 7/2021 | Head ...................... F23R 3/045 |
| 2023/0064335 | A1 | * | 3/2023 | Ryon ...................... F01D 25/12 |
| 2023/0114830 | A1 | * | 4/2023 | Ryon ...................... F02C 7/264 |
| | | | | 60/772 |
| 2023/0193828 | A1 | * | 6/2023 | Ryon ...................... F23R 3/005 |
| | | | | 60/39.821 |
| 2023/0213196 | A1 | * | 7/2023 | Ryon ...................... F23R 3/343 |
| | | | | 60/39.826 |
| 2024/0159189 | A1 | * | 5/2024 | Ryon ...................... F02C 7/266 |

FOREIGN PATENT DOCUMENTS

DE          4320429 A1    12/1994

* cited by examiner

*Primary Examiner* — William H Rodriguez
(74) *Attorney, Agent, or Firm* — Bachman & LaPointe, P.C.

(57) ABSTRACT

A start mechanism ignitor for a propulsion system combustor including a nozzle comprising a nozzle wall forming a nozzle interior; and a torch ignitor attached to the nozzle wall and fluidly coupled with the nozzle interior.

18 Claims, 5 Drawing Sheets

CARBIDE TORCH IGNITER

BACKGROUND

The present disclosure is directed to the improved start mechanism for small engines.

For a prior art small engine E as shown in FIG. 1, the gas turbine engine E requires a charge of compressed air or rapidly expanding gas to initially start the gas turbine engine E. The initial charge of compressed air requires a portable volume of air to start the engine or an expensive pyrotechnic start cartridge gas generator. This volume is conventionally held in a separate pressure vessel (cartridge) V attached to the small engine E. The separate pressure vessel (cartridge) V adds weight, cost and part count to the small engine design.

SUMMARY

In accordance with the present disclosure, there is provided a start mechanism ignitor for a propulsion system combustor comprising a nozzle comprising a nozzle wall forming a nozzle interior; and a torch ignitor attached to the nozzle wall and fluidly coupled with the nozzle interior.

A further embodiment of any of the foregoing embodiments may additionally and/or alternatively include the torch ignitor comprises a torch mixing zone fluidly coupled with a reaction source container upstream of the torch mixing zone; the torch mixing zone fluidly coupled with a torch outlet downstream of the torch mixing zone, the torch outlet fluidly coupled with the nozzle interior.

A further embodiment of any of the foregoing embodiments may additionally and/or alternatively include a valve fluidly coupled between the torch mixing zone and the reaction source container, the valve configured to control a flow of a reaction source material from the reaction source container to the torch mixing zone.

A further embodiment of any of the foregoing embodiments may additionally and/or alternatively include the torch outlet is proximate an ignitor within the nozzle interior.

A further embodiment of any of the foregoing embodiments may additionally and/or alternatively include the torch ignitor comprises a chemical source material within the torch mixing zone and a reaction source material within the reaction source container, wherein the chemical source material and the reaction source material remain inert prior to ignition and subsequently react within the torch mixing zone to produce a flammable gas emitted from the torch outlet.

A further embodiment of any of the foregoing embodiments may additionally and/or alternatively include the chemical source material within the torch mixing zone and a reaction source material within the reaction source container are configured consumable.

A further embodiment of any of the foregoing embodiments may additionally and/or alternatively include the torch ignitor is configured to produce a torch flame fueled by a flammable gas from the reaction of the chemical source material within the torch mixing zone and a reaction source material within the torch mixing zone, the torch flame having energy to ignite a primary flame; and wherein the torch flame and primary flame produce energy to spool up a rotor fluidly coupled with the nozzle for an engine startup.

In accordance with the present disclosure, there is provided a gas turbine engine having a start mechanism ignitor comprising a case supporting a combustion section having a combustor; a nozzle attached to a combustor casing, the nozzle fluidly coupled to a fuel injector upstream from the nozzle; a nozzle wall defining a nozzle interior; and a torch ignitor attached to the nozzle wall and fluidly coupled with the nozzle interior; wherein the torch ignitor comprises a torch mixing zone fluidly coupled with a reaction source container upstream of the torch mixing zone; the torch mixing zone fluidly coupled with a torch outlet downstream of the torch mixing zone, the torch outlet fluidly coupled with the nozzle interior.

A further embodiment of any of the foregoing embodiments may additionally and/or alternatively include the gas turbine engine having the start mechanism ignitor further comprising a valve fluidly coupled between the torch mixing zone and the reaction source container.

A further embodiment of any of the foregoing embodiments may additionally and/or alternatively include the torch outlet is fluidly coupled with a fuel injector.

A further embodiment of any of the foregoing embodiments may additionally and/or alternatively include the torch outlet is proximate an ignitor within the nozzle interior.

A further embodiment of any of the foregoing embodiments may additionally and/or alternatively include the torch ignitor comprises a chemical source material within the torch mixing zone and a reaction source material within the reaction source container, wherein the chemical source material and the reaction source material remain inert prior to ignition and subsequently react within the torch mixing zone to produce a flammable gas emitted from the torch outlet.

A further embodiment of any of the foregoing embodiments may additionally and/or alternatively include the torch ignitor is configured to produce a torch flame fueled by a flammable gas from the reaction of the chemical source material within the torch mixing zone and a reaction source material within the torch mixing zone, the torch flame having energy to ignite a primary flame; and wherein the torch flame and primary flame produce energy to spool up a rotor fluidly coupled with the nozzle for an engine startup.

In accordance with the present disclosure, there is provided a process of forming a gas turbine engine having a start mechanism ignitor comprising forming a case supporting a combustion section having a combustor with a combustor casing; attaching a nozzle to the combustor casing; fluidly coupling the nozzle to a fuel injector upstream from the nozzle; forming a nozzle wall defining a nozzle interior; and attaching a torch ignitor to the nozzle wall; fluidly coupling the torch ignitor with the nozzle interior; fluidly coupling a torch mixing zone with a reaction source container upstream of the torch mixing zone; fluidly coupling the torch mixing zone with a torch outlet downstream of the torch mixing zone; and fluidly coupling the torch outlet with the nozzle interior.

A further embodiment of any of the foregoing embodiments may additionally and/or alternatively include the process further comprising fluidly coupling a valve between the torch mixing zone and the reaction source container, configuring the valve to control a flow of a reaction source material from the reaction source container to the torch mixing zone.

A further embodiment of any of the foregoing embodiments may additionally and/or alternatively include the process further comprising fluidly coupling the torch outlet with a fuel injector.

A further embodiment of any of the foregoing embodiments may additionally and/or alternatively include the process further comprising locating the torch outlet proximate an ignitor within the nozzle interior.

A further embodiment of any of the foregoing embodiments may additionally and/or alternatively include the process further comprising locating a chemical source material within the torch mixing zone; locating a reaction source material within the reaction source container; wherein the chemical source material and the reaction source material remain inert prior to ignition and subsequently react within the torch mixing zone to produce a flammable gas emitted from the torch outlet.

A further embodiment of any of the foregoing embodiments may additionally and/or alternatively include the process further comprising configuring the torch ignitor to produce a torch flame fueled by a flammable gas from the reaction of the chemical source material within the torch mixing zone and a reaction source material within the torch mixing zone, the torch flame having energy to ignite a primary flame; and wherein the torch flame and primary flame produce energy to spool up a rotor fluidly coupled with the nozzle for an engine startup.

A further embodiment of any of the foregoing embodiments may additionally and/or alternatively include the chemical source material comprises a calcium carbide and the reaction source material comprises water.

Other details of the start mechanism for small engines are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. The embodiments shown in the individual figures are not limiting and can be combined to reflect a blended concept. For clarity, not every element may be labeled in every figure. The drawings are not necessarily to scale, emphasis instead being placed upon illustrating the principles of the disclosure.

DETAILED DESCRIPTION

Figure 1:
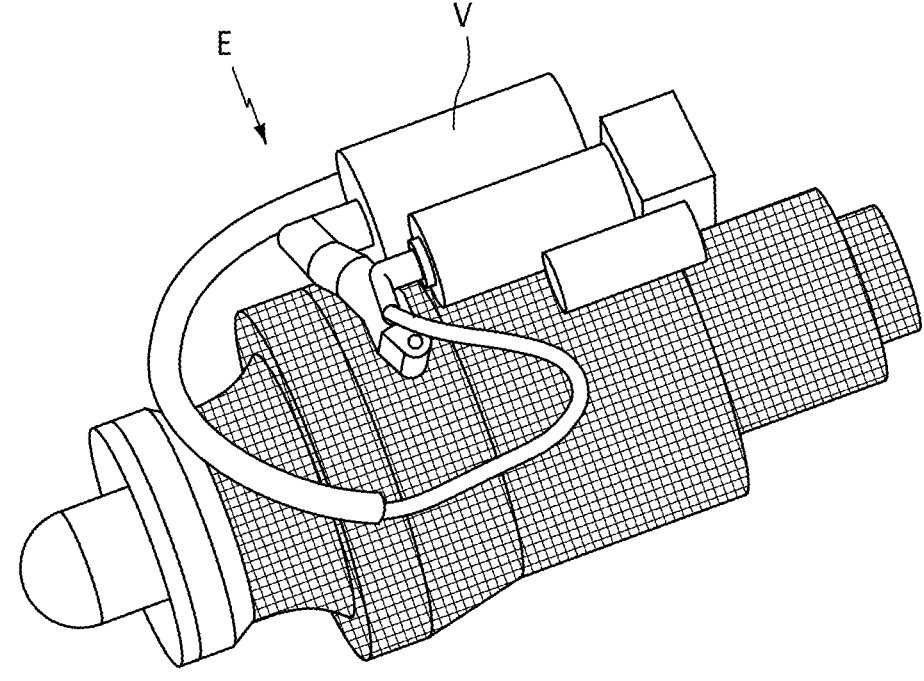
FIG. 1 is an isometric view of a schematic representation of a prior art gas turbine engine.
Figure 2:
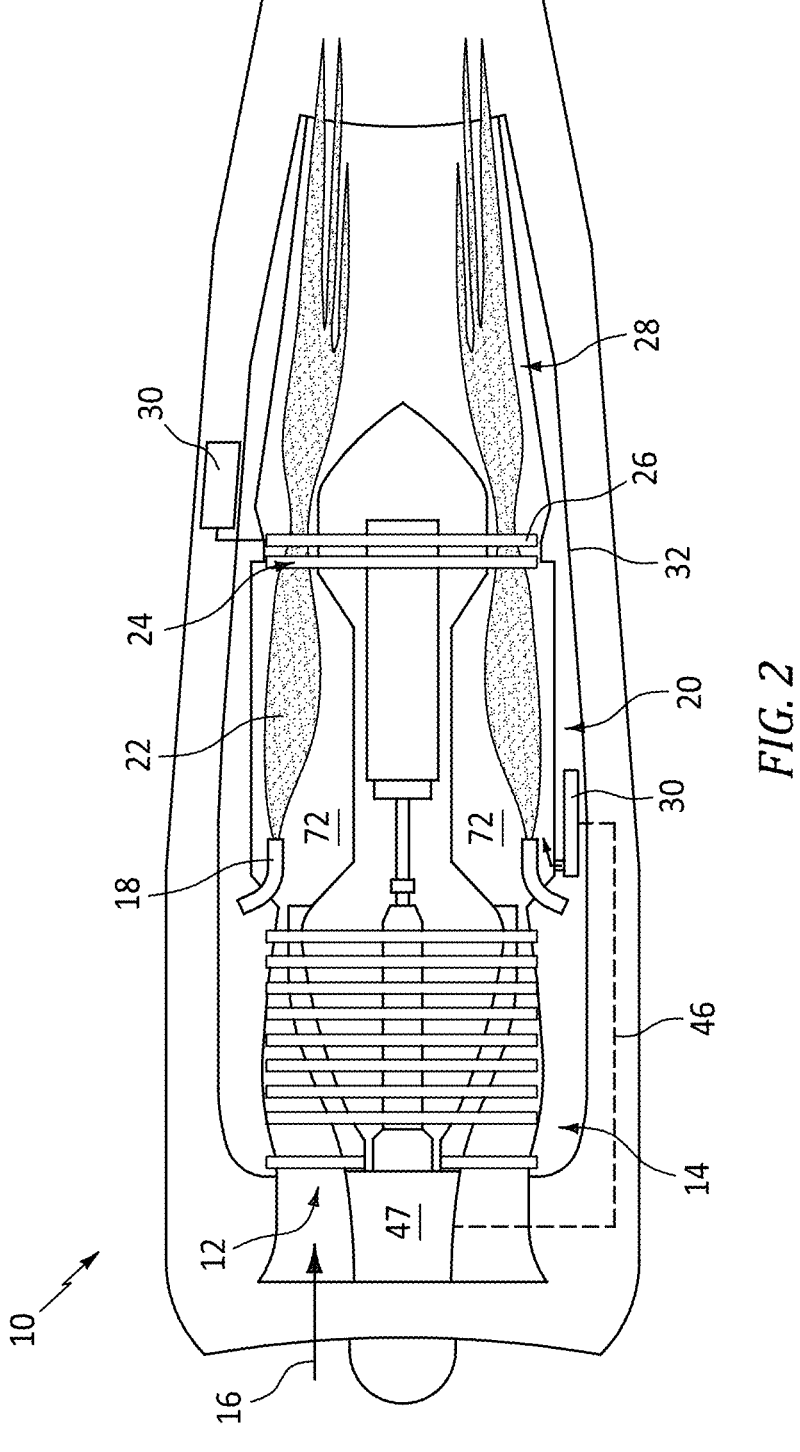
FIG. 2 is a cross sectional view schematic representation of an exemplary gas turbine engine.

Referring now to FIG. 2, there is illustrated an exemplary gas turbine engine, specifically a turbojet engine 10. The gas turbine engine 10 includes an inlet section 12 upstream of a compressor section 14 where air 16 is drawn in and compressed. Fuel 18 is injected into a combustion section 20 downstream of the compressor section 14. The air 16 is mixed with fuel 18 and burned in the combustion section 20. The combusted fuel 18 and air 16 are combined into a highly energized combustion product 22 (products of combustion 22) that expands through a turbine section 24. The products of combustion 22 move downstream over turbine rotors 26, driving the turbine rotors 26 to rotate creating rotary power. The products of combustion 22 move downstream and exit the turbine section 24 to the exhaust nozzle section 28 where engine thrust is developed for propulsion. The engine 10 may also include a generator 47 such as an anterior-mounted, permanent magnet generator (PMG). The generator 47 may operate in two modes, one as a generator to generate electricity, the other as a motor to spin the turbine 24 to spool up the engine 10 for starting the engine 10.

Figure 3:
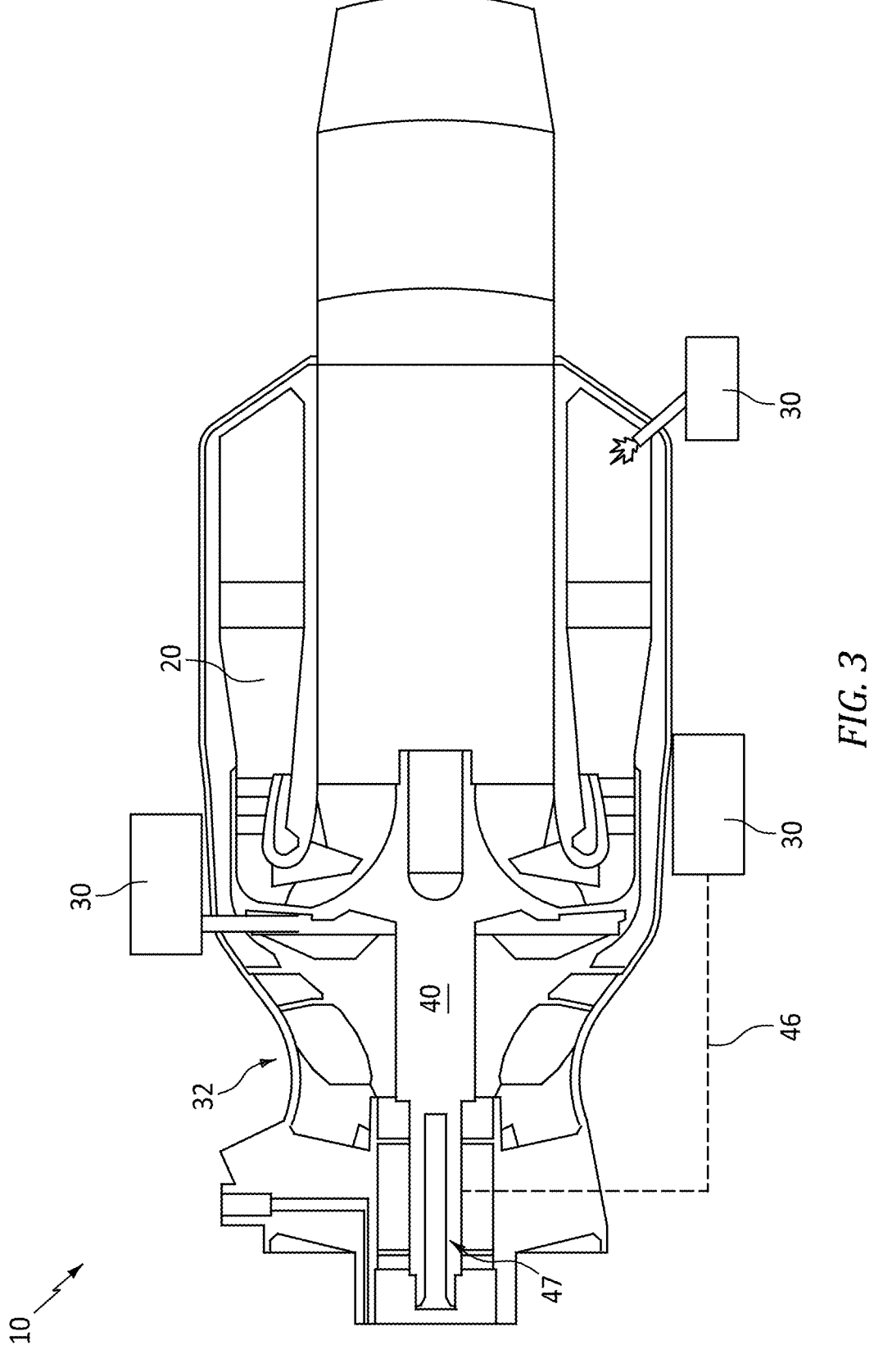
FIG. 3 is a cross sectional view schematic representation of an exemplary gas turbine engine.
Figure 4:
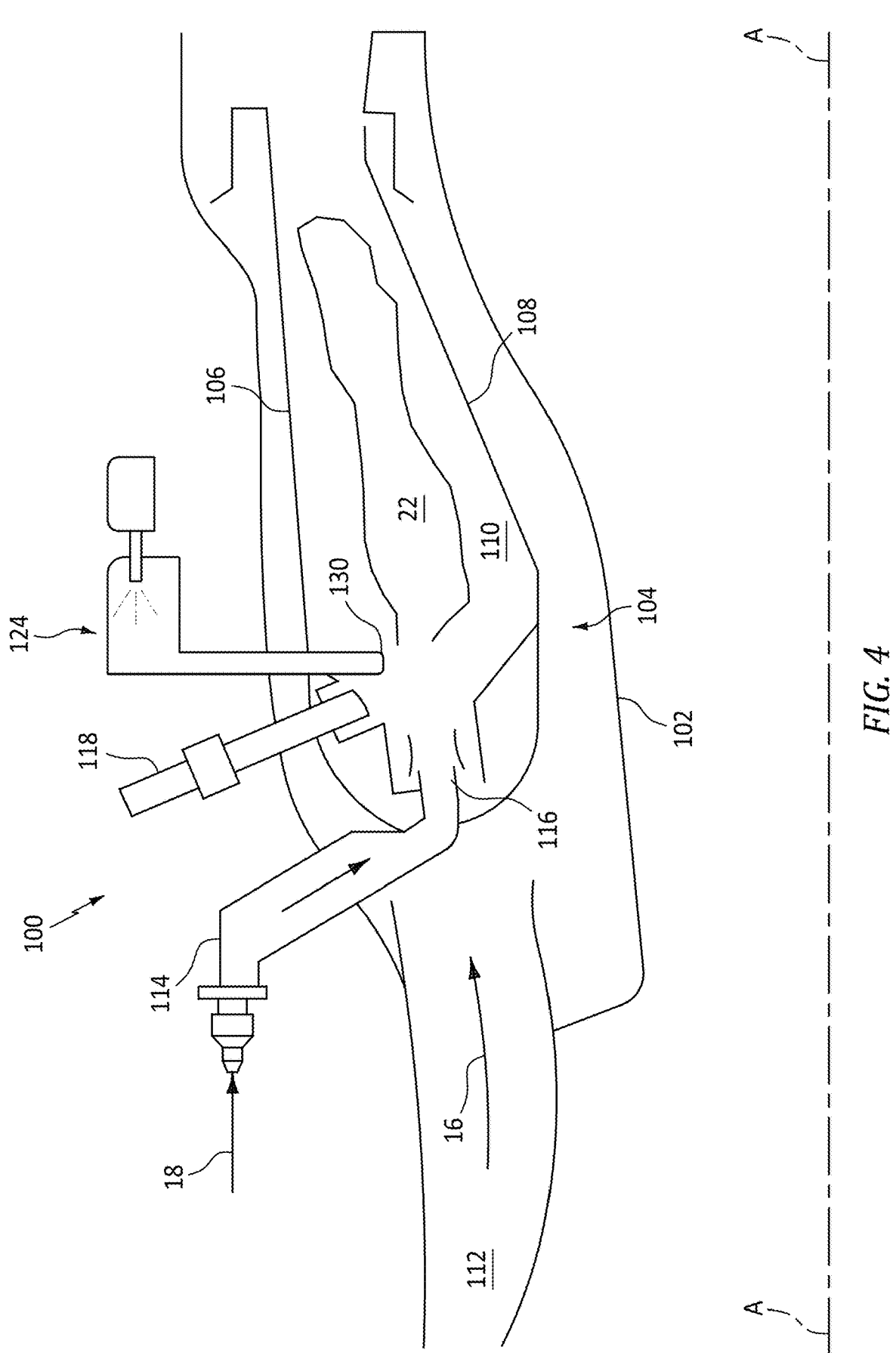
FIG. 4 is a cross sectional view schematic representation of a combustor with exemplary start mechanism igniter.
Figure 5:
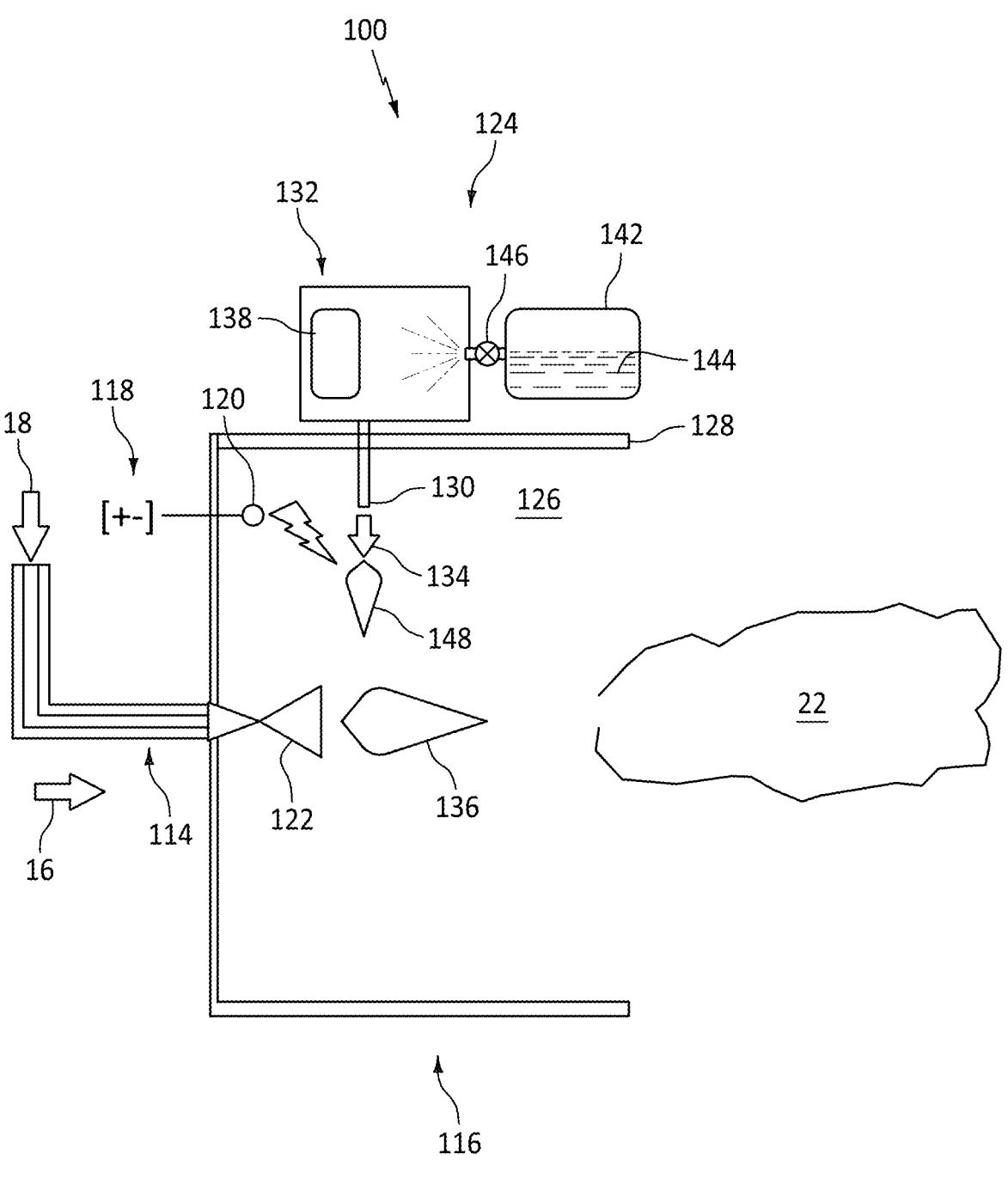
FIG. 5 is a cross sectional view schematic representation of an exemplary start mechanism igniter.

Referring also to FIG. 3, FIG. 4 and FIG. 5, the exemplary gas turbine engine 10 with exemplary start mechanism 30 is shown. The start mechanism 30 is shown in operative communication with a case 32 of the gas turbine engine 10. There can be multiple start mechanisms 30. It is contemplated that the start mechanism 30, or a portion of the start mechanism 30, can also be located in other sections of the gas turbine engine 10, such as within cavities formed within the case 32, at an exterior surface of the case and the like. The start mechanism may include a means to spool up the rotor 26, 40 (FIGS. 2, 3 respectively), and a means to ignite mixture of fuel 18 and air 16.

Referring also to FIG. 4 and FIG. 5 showing an exemplary start mechanism with ignitor 100. The combustor 72 can include a combustor casing 102. The combustor casing encloses a combustor liner 104. The combustor liner 104 includes an outer liner 106 and an inner liner 108 enclosing a combustion chamber 110. The outer liner 106 and inner liner 108 are located radially relative to a central axis A. The combustor 72 includes a diffuser 112 upstream of the combustor liner 104. The diffuser 112 supplies air 16 into the combustor 72. The combustor 72 includes a fuel injector 114 fluidly coupled with a nozzle 116. The fuel injector 114 supplies the liquid fuel 18 into the combustor 72 to the nozzle 116. The combustor 72 includes an ignitor 118 in operative communication with the nozzle 116 and combustion chamber 110. The igniter 118 provides an ignition source 120, such as a spark, into the combustion chamber 72 proximate the nozzle 116. The ignition source 120 ignites the liquid fuel 18 air 16 mixture 122 in the nozzle 116 to create the combustion product 22.

A torch ignitor 124 is placed in operative communication with the nozzle 116. The torch ignitor 124 can be placed downstream from the fuel injector 114. The torch ignitor 124 can be placed proximate the ignitor 118 within a nozzle interior 126.

In the embodiment shown at FIG. 5, the torch ignitor 124 is coupled to the nozzle 116 through a nozzle wall 128. The torch ignitor 124 can include a torch outlet 130 that is in fluid communication between the nozzle interior 126 and a torch mixing zone 132 upstream of the nozzle 116. The torch outlet 130 can be sized to allow for a flammable gas/vapor 134 to flow upon initiation of the fuel air mixture 122 in a sustainable rate that maintains combustion of a primary flame 136. The flammable gas/vapor 134 can be acetylene gas or similar gas that is combustible. The primary flame 136 is the flame that results from the initial combustion of the fuel air mixture 122 at ignition within the nozzle 116.

The torch mixing zone 132 can contain a chemical source 138. The torch mixing zone 132 can be in fluid communication with a reaction source material container 142. The reaction source material container 142 is configured to contain a reaction source material 144. The chemical source 138 can be capable of reacting with the reaction source material 144. The byproduct of the chemical source 138 and reaction source material 144 can be the flammable gas/vapor 134 emitted from the torch outlet 130.

In an exemplary embodiment, the chemical source 138 can be calcium carbide. The reaction source material 144 can be water. The water can be in a liquid phase. The flammable gas/vapor 134 can be the acetylene that is produced from the reaction between the calcium carbide and water.

A valve 146 can be fluidly coupled between the reaction source container 142 and the torch mixing zone 132. The valve 146 can be actuated to allow a flow of the reaction source material 144 to flow into the mixing zone 132 and react with the chemical source material 138. The resultant flammable gas/vapor 134 can flow out of the torch outlet 130 and be exposed to the ignition source 120, such as a spark. The flammable gas/vapor 134 can ignite and create a torch flame 148.

The torch flame 148 can be employed to ignite the primary flame 136 burning the fuel air mixture 122 within the nozzle 116.

The chemical source material 138 and reaction source material 144 can be configured to be consumed after ignition of the primary flame 136. The torch flame 148 can be configured to contribute to the combustion product 22 and enhance the quantity of thermal energy and ultimately kinetic energy into the engine 10 at startup. The nozzle 116 can operate at full capacity flow after the engine has attained normal operational conditions.

In operation, the start mechanism ignitor 100 can be idle prior to the need for engine 10 startup. The chemical source material 138 and reaction source material 144 can be inert and have a long storage life under normal storage conditions. Upon startup of the engine 10, the start mechanism ignitor 100 receives low airflow of air 16 through the nozzle 116. A fuel 18 flow can begin through the fuel injector 114. The valve 146 can operate to allow flow of the reaction source material 144 into the torch mixing zone 132. The flammable gas/vapor 134 can be discharged from the torch outlet 130. The ignitor 118 can energize and provide the ignition source 120, such as a spark proximate the flammable gas/vapor 134 as well as the fuel air mixture 122 within the nozzle 116. The torch flame 148 can be ignited. The primary flame 136 can be ignited. The primary flame 136 and the torch flame 148 provide enough energy to turn the rotor 26 of the turbine section 24 (rotor 40 in FIG. 3). The engine 10 can spool up to full power. The flammable gas/vapor 134 can be fully consumed. The torch flame 142 can be extinguished after consumption of the chemical source material 138 and reaction source material 144. The primary flame 136 can be fully operational to produce the combustion products 22. The engine 10 can operate at a normal running speed and provide enough air flow and fuel supply to operate with a self-sustaining full power primary flame 136.

A technical advantage of the disclosed start mechanism igniter includes a readily available energy source for the engine.

Another technical advantage of the disclosed start mechanism igniter includes a source for ignition in the combustion section.

Another technical advantage of the disclosed start mechanism igniter includes a device that minimizes the engine size for improved vehicle integration.

There has been provided a start mechanism igniter. While the start mechanism igniter has been described in the context of specific embodiments thereof, other unforeseen alternatives, modifications, and variations may become apparent to those skilled in the art having read the foregoing description. The embodiments can be interchanged and combined. Accordingly, it is intended to embrace those alternatives, modifications, and variations which fall within the broad scope of the appended claims.

What is claimed is:

1. A start mechanism ignitor for a propulsion system combustor comprising:
    a nozzle comprising a nozzle wall forming a nozzle interior; and
    a torch ignitor attached to the nozzle wall and fluidly coupled with the nozzle interior;
    a torch mixing zone fluidly coupled with a reaction source container upstream of the torch mixing zone; the torch mixing zone fluidly coupled with a torch outlet downstream of the torch mixing zone, the torch outlet fluidly coupled with the nozzle interior; wherein the torch ignitor comprises a chemical source material within the torch mixing zone and a reaction source material within the reaction source container, wherein the chemical source material is a calcium carbide and the reaction source material is water.

2. The start mechanism ignitor for a propulsion system combustor according to claim 1, further comprising:
    a valve fluidly coupled between the torch mixing zone and the reaction source container.

3. The start mechanism ignitor for a propulsion system combustor according to claim 1, wherein the torch outlet is proximate an ignitor within the nozzle interior.

4. The start mechanism ignitor for a propulsion system combustor according to claim 1, wherein the chemical source material and the reaction source material remain inert prior to ignition and subsequently react within the torch mixing zone to produce a flammable gas emitted from the torch outlet.

5. The start mechanism ignitor for a propulsion system combustor according to claim 1, wherein the chemical source material within the torch mixing zone and a reaction source material within the reaction source container are configured consumable.

6. The start mechanism ignitor for a propulsion system combustor according to claim 1, wherein the torch ignitor is configured to produce a torch flame fueled by a flammable gas comprising acetylene from the reaction of the chemical source material within the torch mixing zone and a reaction source material within the torch mixing zone, the torch flame having energy to ignite a primary flame; and wherein the torch flame and primary flame produce energy to spool up a rotor fluidly coupled with the nozzle for an engine startup.

7. A gas turbine engine having a start mechanism ignitor comprising:
    a case supporting a combustion section having a combustor;
    a nozzle attached to a combustor casing, the nozzle fluidly coupled to a fuel injector upstream from the nozzle;
    a nozzle wall defining a nozzle interior; and
    a torch ignitor attached to the nozzle wall and fluidly coupled with the nozzle interior; wherein the torch ignitor comprises a torch mixing zone fluidly coupled with a reaction source container upstream of the torch mixing zone; the torch mixing zone fluidly coupled with a torch outlet downstream of the torch mixing zone, the torch outlet fluidly coupled with the nozzle interior; wherein the torch ignitor comprises a chemical source material within the torch mixing zone and a reaction source material within the reaction source container, wherein the chemical source material is a calcium carbide and the reaction source material is water.

8. The gas turbine engine having the start mechanism ignitor according to claim 7, further comprising:

a valve fluidly coupled between the torch mixing zone and the reaction source container, the valve configured to control a flow of a reaction source material from the reaction source container to the torch mixing zone.

9. The gas turbine engine having the start mechanism ignitor according to claim 7, wherein the torch outlet is fluidly coupled with a fuel injector.

10. The gas turbine engine having the start mechanism ignitor according to claim 7, wherein the torch outlet is proximate an ignitor within the nozzle interior.

11. The gas turbine engine having the start mechanism ignitor according to claim 7, wherein the chemical source material and the reaction source material remain inert prior to ignition and subsequently react within the torch mixing zone to produce a flammable gas emitted from the torch outlet.

12. The gas turbine engine having the start mechanism ignitor according to claim 7, wherein the torch ignitor is configured to produce a torch flame fueled by a flammable gas comprising acetylene from the reaction of the chemical source material within the torch mixing zone and a reaction source material within the torch mixing zone, the torch flame having energy to ignite a primary flame; and wherein the torch flame and primary flame produce energy to spool up a rotor fluidly coupled with the nozzle for an engine startup.

13. A process of forming a gas turbine engine having a start mechanism ignitor comprising:

forming a case supporting a combustion section having a combustor with a combustor casing;

attaching a nozzle to the combustor casing;

fluidly coupling the nozzle to a fuel injector upstream from the nozzle;

forming a nozzle wall defining a nozzle interior; and attaching a torch ignitor to the nozzle wall;

fluidly coupling the torch ignitor with the nozzle interior;

fluidly coupling a torch mixing zone with a reaction source container upstream of the torch mixing zone;

fluidly coupling the torch mixing zone with a torch outlet downstream of the torch mixing zone;

fluidly coupling the torch outlet with the nozzle interior;

locating a chemical source material within the torch mixing zone; and locating a reaction source material within the reaction source container, wherein the chemical source material is a calcium carbide and the reaction source material is water.

14. The process of claim 13, further comprising:

fluidly coupling a valve between the torch mixing zone and the reaction source container; configuring the valve to control a flow of a reaction source material from the reaction source container to the torch mixing zone.

15. The process of claim 14, further comprising:

fluidly coupling the torch outlet with a fuel injector.

16. The process of claim 13, further comprising:

locating the torch outlet proximate an ignitor within the nozzle interior.

17. The process of claim 13, wherein the chemical source material and the reaction source material remain inert prior to ignition and subsequently react within the torch mixing zone to produce a flammable gas emitted from the torch outlet.

18. The process of claim 13, further comprising:

configuring the torch ignitor to produce a torch flame fueled by a flammable gas comprising acetylene from the reaction of the chemical source material within the torch mixing zone and a reaction source material within the torch mixing zone, the torch flame having energy to ignite a primary flame; and wherein the torch flame and primary flame produce energy to spool up a rotor fluidly coupled with the nozzle for an engine startup.

\* \* \* \* \*